Patented Feb. 2, 1954

2,668,266

UNITED STATES PATENT OFFICE 2,668,266

LOAD RELAY CIRCUIT FOR INDUCTION MOTORS

Richard B. Hunter, Cuernavaca, Morelos, Mexico, and Eric Pell, Shorewood, and Norbert L. Schmitz, Madison, Wis., assignors to Cutler-Hammer, Inc., Milwaukee, Wis., a corporation of Delaware Original application August 31, 1944, Serial No. 552,046, now Patent No. 2,620,464, dated December 2, 1952. Divided and this application April 28, 1952, Serial No. 284,735

2 Claims. (Cl. 318—414)

This invention relates to a load relay circuit for induction motor systems.

The present application is a division of our application Serial No. 552,046, filed August 31, 1944, now Patent No. 2,620,464.

Where a current relay is employed in connection with an induction motor for measuring loads it is in some instances important that the relay be free from the influence of certain of the components of the total primary current, and it is an object of the present invention to provide a relay circuit effective to protect the relay against such undesirable influence.

More particularly the invention has among its objects to provide a relay circuit which will free the relay from the influence of such components as the magnetizing current and the no load current, thereby to render the relay controllable substantially exclusively by the load component of the total primary current.

Another object is to provide such a relay circuit especially advantageous for use in hoisting and lowering systems where high speed lowering of a light load is desired and where the load measuring means relied upon must be reliable and accurate.

Other objects and advantages of the invention will hereinafter appear.

The accompanying drawings illustrate an embodiment of the invention which will now be described, it being understood that the embodiment illustrated is susceptible of various modifications without departing from the scope of the appended claims.

Figure 1:
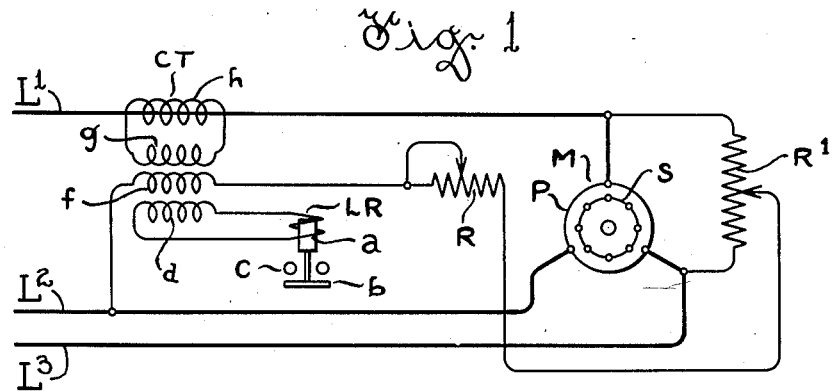
Figure 1 shows a preferred relay circuit.

Referring to Fig. 1, the same shows an induction motor M having a primary P and a secondary S which may be of the slip ring type or of the squirrel cage type. The primary of the motor is shown as supplied with power from lines $L^1$, $L^2$ and $L^3$, the usual means for controlling the power connections being omitted for simplicity of illustration. As will be understood, the motor secondary if of the slip ring type may be provided with control of any of various well known types.

Further referring to Fig. 1, it shows a load relay LR which may be of any suitable construction. For simplicity of illustration the load relay is shown diagrammatically as comprising a winding $a$ responsive to lift a movable contact element $b$ which has associated therewith stationary contacts $c$ to be bridged thereby. As shown the contacts $c$ are adapted to be bridged by element $b$ upon response of the winding $a$, but as will be understood the contacts $c$ might be normally bridged by the element $b$ and disengaged thereby upon response of winding $a$. Winding $a$ is connected in a loop circuit with the output winding $d$ of a mixing transformer T which is provided with input windings $f$ and $g$. The winding $f$ is connected at one end to supply line $L^2$ and is connected at its other end in series with an adjustable rheostat R to the adjusting element of a potentiometer rheostat $R^1$ which has its resistance element connected across supply lines $L^1$ and $L^3$. Winding $g$ of transformer T is connected in a loop circuit with the circuit coil $h$ of a current transformer CT associated with supply line $L^1$.

Figure 2:
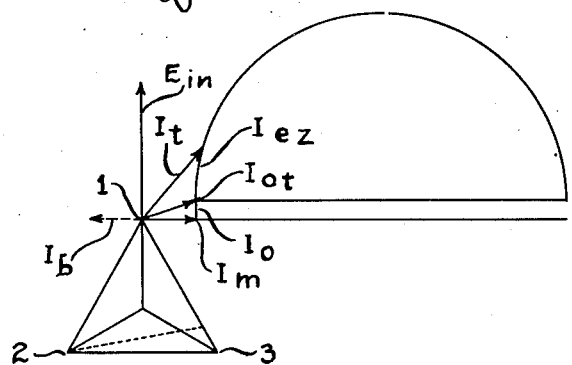
Fig. 2 shows the voltage and current relations of one phase of an induction motor.

As will be understood, the current coil $h$ of transformer CT subjects the winding $g$ of transformer T to a current proportional to the total primary current. The flux produced by winding $g$ is partially bucked out by the flux produced by the current flowing in winding $f$. Thus a current is induced in winding $d$ which has certain components of the primary current bucked out and such current flows through the winding $a$ of load relay LR. Reference will now be made to Fig. 2 in further explaining the circuit described.

In Fig. 2 the triangle 1, 2, 3 represents the line and phase to neutral voltages, $I_m$ the magnetizing current at rated voltage, $I_o$ the no load loss, $I_{ot}$ the no load total primary current, $I_{ez}$ the load component of the current for a certain load, and $I_t$ the total primary current at such load, $I_t$ being the sum of all the aforementioned components. The phase to neutral voltage of phase 1 is represented by the vector $E_{in}$ and the magnetizing current of this phase is lagging such voltage by 90 degrees. To buck out this magnetizing component $I_m$ there is depicted an equal and oppositely directed component $I_b$. The winding $f$ of the transformer T is provided to supply the aforementioned component $I_b$ which bucks out the magnetizing current component $I_m$. Such component $I_b$ can also be provided by connecting the winding $f$ of transformer T across lines $L^1$ and $L^2$ in series with the adjustable resistor R. On the other hand, the connection of winding $f$ as shown in Fig. 1 enables bucking out the magnetizing current component and also some of the load component. The adjustable resistor R and rheostat $R^1$, for example, can be adjusted for bucking out the no load current $I_{ot}$. The current flowing through the winding $a$ of relay LR will be equal to the difference between the total primary current and the bucking component flowing in winding f, and thus the relay will be rendered effective to measure and will be responsive to the load component of the primary current.

We claim:

1. In combination, a polyphase motor, a polyphase alternating current supply therefor, a single coil relay, a current transformer deriving from one phase of the motor primary a first current, a rheostat having its resistor connected across two terminals of the motor primary, an adjustable resistor, a transformer having a first winding in circuit with said current transformer for supply of said first current, a second winding connected to a third terminal of the motor primary and to the adjusting element of said rheostat in series with said adjustable resistor to provide a second current, and a third winding connected in circuit with the coil of said relay to subject said coil to the resultant current of said first current bucked by said second current, said second current being adjustable in accordance with the setting of said rheostat and said adjustable resistor to bear a given relation to certain components of the motor primary and thereby render said relay sensitive to the load component of the motor primary with certain of the current components of the motor primary bucked out.

2. In combination, a polyphase motor, a polyphase alternating current supply therefor, a single coil relay, a current transformer deriving from one phase of the motor primary a first current, an adjustable resistor, a transformer having a first winding in circuit with said current transformer for supply of said first current, a second winding subjected at one end, in series with said adjustable resistor, to the voltage between two terminals of the motor primary and connected at its other end to a third terminal of the motor primary for supply of a second current, and a third winding connected in circuit with the coil of said relay to subject said coil to the resultant current of said first current bucked by said second current, said second current being adjustable in accordance with the setting of said adjustable resistor to bear a given relation to certain components of the motor primary and thereby render said relay sensitive to the load component of the motor primary with certain of the current components of the motor primary bucked out.

RICHARD B. HUNTER.
ERIC PELL.
NORBERT L. SCHMITZ.

References Cited in the file of this patent
UNITED STATES PATENTS

| Number | Name | Date |
|---|---|---|
| 1,072,132 | Lutz | Sept. 2, 1913 |
| 1,924,754 | Seeley | Aug. 22, 1933 |
| 2,062,135 | Lilja | Nov. 24, 1936 |
| 2,117,839 | Chubb | May 17, 1938 |
| 2,247,506 | Kutcher et al. | July 1, 1941 |
| 2,469,706 | Winther | May 10, 1949 |
| 2,620,464 | Hunter et al. | Dec. 2, 1952 |

FOREIGN PATENTS

| Number | Country | Date |
|---|---|---|
| 692,554 | Germany | Dec. 2, 1952 |